(12) United States Patent  
Pieschel et al.

(10) Patent No.: US 7,887,141 B2
(45) Date of Patent: Feb. 15, 2011

(54) ARTICULATED UTILITY CART

(75) Inventors: Frank Pieschel, Apple Valley, MN (US); Robert J. Jantschek, Still Water, MN (US); Dennis Simpson, Minnetonka, MN (US); Jeff Skubic, Elk River, MN (US)

(73) Assignee: Tricam Industries, Inc., Eden Prairie, MN (US)

( * ) Notice: Subject to any disclaimer, the term of this patent is extended or adjusted under 35 U.S.C. 154(b) by 719 days.

(21) Appl. No.: 11/546,941

(22) Filed: Oct. 12, 2006

(65) Prior Publication Data

US 2007/0200419 A1    Aug. 30, 2007

Related U.S. Application Data

(60) Continuation-in-part of application No. 10/977,254, filed on Oct. 29, 2004, now Pat. No. 7,390,065, which is a division of application No. 10/395,010, filed on Mar. 21, 2003, now Pat. No. 6,851,756.

(60) Provisional application No. 60/733,560, filed on Nov. 4, 2005.

(51) Int. Cl.
  *B60P 1/12* (2006.01)
(52) U.S. Cl. .................... 298/2; 298/17 R; 298/17.5; 298/17.8
(58) Field of Classification Search ............... 298/2, 298/11, 17 R, 17.5, 17.8, 17 T; 280/47.18, 280/47.26, 491.1, 43.16, 43.15; 414/482
See application file for complete search history.

(56) References Cited

U.S. PATENT DOCUMENTS

| 74,131 | A | | 2/1868 | Priest |
|---|---|---|---|---|
| 115,244 | A | | 5/1871 | Skeen |
| 128,429 | A | | 6/1872 | Skeen |
| 587,960 | A | * | 8/1897 | Hammer ..................... 298/2 |
| 1,659,245 | A | | 2/1928 | Delker |
| 1,707,345 | A | * | 4/1929 | Brown .................. 298/20 A |
| 3,000,671 | A | | 9/1961 | Monegato |
| 3,158,402 | A | * | 11/1964 | Clement ................ 298/20 R |
| 3,281,186 | A | | 10/1966 | Davis |
| 3,833,263 | A | | 9/1974 | Jackson |
| 4,126,324 | A | | 11/1978 | Browning |
| 4,239,258 | A | | 12/1980 | Burris |
| 4,468,046 | A | | 8/1984 | Rutherford |

(Continued)

FOREIGN PATENT DOCUMENTS

CN        2234885 Y     9/1996

(Continued)

OTHER PUBLICATIONS

World Factory Poly Cart (4 pages).

(Continued)

*Primary Examiner*—Stephen Gordon
(74) *Attorney, Agent, or Firm*—Patterson Thuente Christensen Pedersen, P.A.

(57) ABSTRACT

An articulated cart includes a chassis, a bed pivotably coupled to the chassis, a set of front wheels operably coupled to the chassis, and a set of rear wheels operably coupled to the bed. A method of manufacturing an articulated cart and of dumping an articulated cart are further included.

19 Claims, 17 Drawing Sheets

U.S. PATENT DOCUMENTS

| | | | |
|---|---|---|---|
| 4,511,181 A | 4/1985 | Schantz | |
| 4,697,976 A | 10/1987 | Godbersen | |
| 4,711,499 A | 12/1987 | Fortin | |
| 4,746,142 A | 5/1988 | Davis | |
| 4,758,008 A | 7/1988 | Moddejonge | |
| 4,768,806 A | 9/1988 | Tétreault | |
| 4,786,073 A | 11/1988 | Harper | |
| 4,889,390 A | 12/1989 | Campbell | |
| 4,995,129 A | 2/1991 | Comardo | |
| 5,340,134 A | 8/1994 | Dodson | |
| 5,350,030 A | 9/1994 | Mawhinney et al. | |
| 5,387,001 A | 2/1995 | Hull et al. | |
| 5,395,163 A | 3/1995 | Mandell et al. | |
| 5,439,239 A | 8/1995 | Su | |
| 5,544,944 A | 8/1996 | Keech | |
| 5,769,449 A | 6/1998 | Keesee | |
| 5,957,482 A | 9/1999 | Shorter | |
| 6,176,504 B1 | 1/2001 | Van Mill et al. | |
| 6,213,053 B1 | 4/2001 | Lammers | |
| 6,290,301 B1 | 9/2001 | Bockman | |
| 6,378,893 B1 | 4/2002 | Jager | |
| 6,511,092 B1 | 1/2003 | Chepa | |
| 6,692,014 B1 * | 2/2004 | Grosso et al. | |
| 6,834,882 B1 | 12/2004 | Boyd | |
| 6,851,756 B2 | 2/2005 | Pieschel | |
| 6,962,370 B2 | 11/2005 | Simpson | |
| 7,052,033 B2 | 5/2006 | McDonell | |
| 7,055,848 B1 | 6/2006 | James | |
| 7,175,205 B2 | 2/2007 | Simpson | |
| 7,390,065 B2 * | 6/2008 | Pieschel et al. | 298/2 |
| 2005/0057020 A1 | 3/2005 | Pieschel | |
| 2006/0091646 A1 | 5/2006 | Steins | |

FOREIGN PATENT DOCUMENTS

| | | |
|---|---|---|
| CN | 2592470 Y | 12/2003 |
| RU | 1830013 A3 | 7/1993 |

OTHER PUBLICATIONS

MCM International Black Cat Model MH1100 Monster Wagon Owner's Manual (4 pages).

* cited by examiner

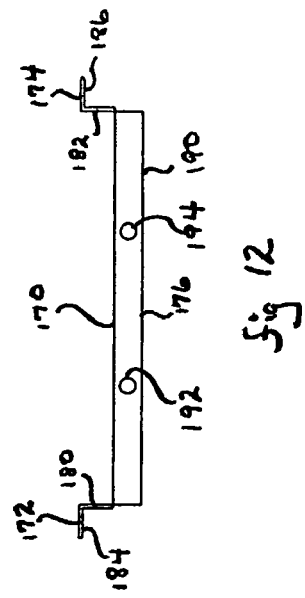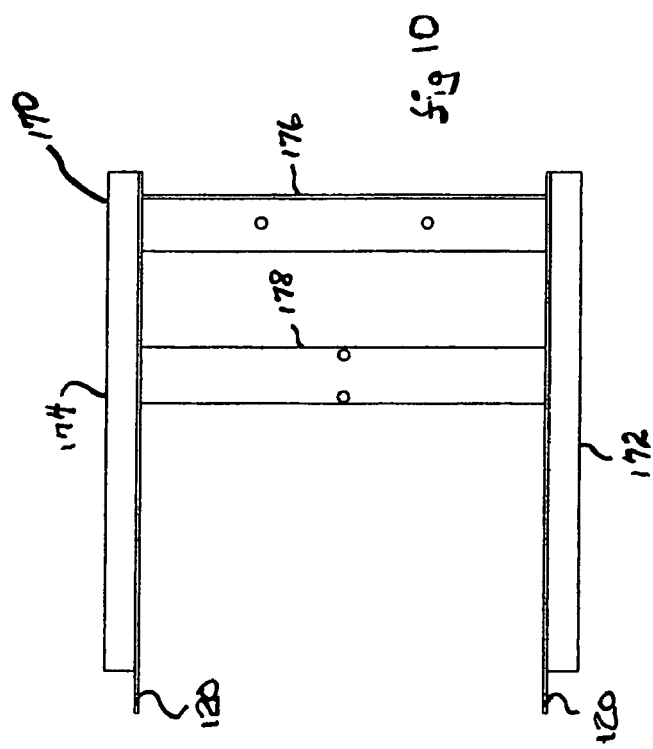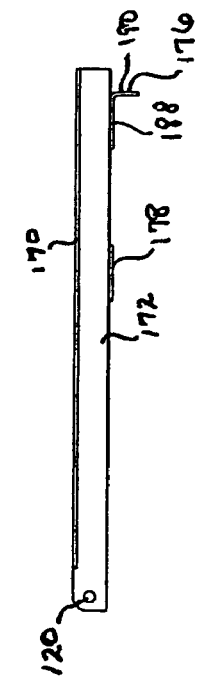

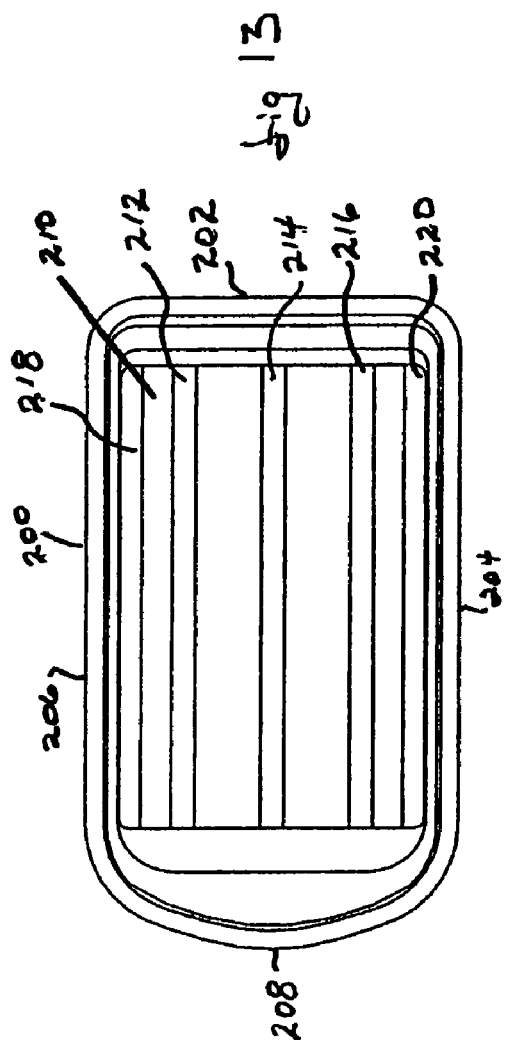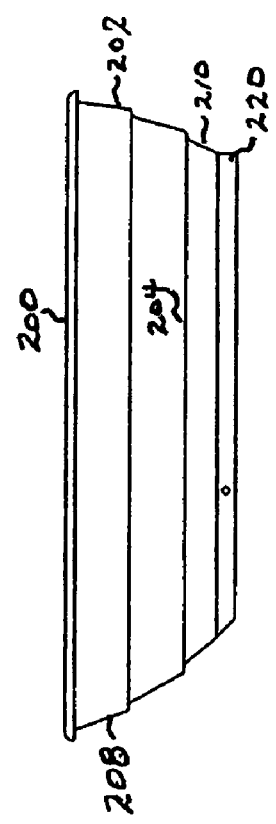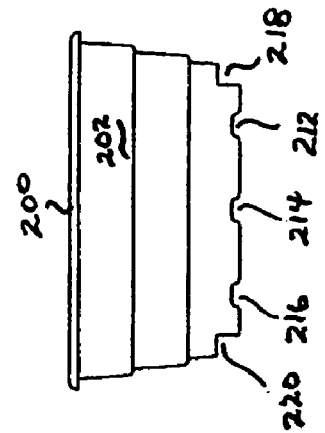

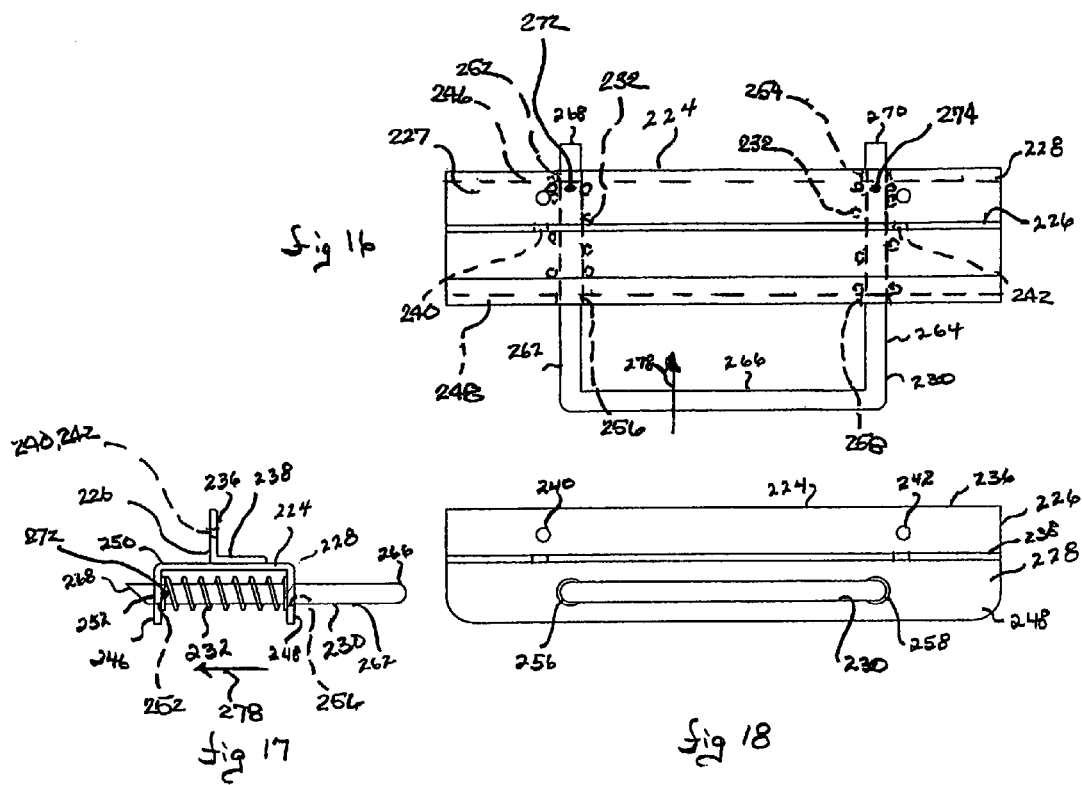

ARTICULATED UTILITY CART

CROSS REFERENCE TO RELATED APPLICATIONS

This application claims the benefit of U.S. Provisional Patent Application 60/733,560, filed 4 Nov. 2005 and is a continuation-in-part of U.S. patent application Ser. No. 10/977,254, filed 29 Oct. 2004, now U.S. Pat. No. 7,390,065, which is a division of U.S. patent application Ser. No. 10/395,010, filed 21 Mar. 2003, now U.S. Pat. No. 6,851,756, each hereby incorporated by reference.

FIELD OF THE INVENTION

The invention relates generally to carts used for transporting and dumping articles. More particularly, the present invention relates to an improved dumping utility cart designed for ease in dumping articles.

BACKGROUND OF THE INVENTION

It is often desirable to transport cumbersome articles through the use of a vehicle. Furthermore, it is desirable to transport and easily dump large volumes of heavy particulate matter, such as dirt, loose gravel, and livestock feed. Such a vehicle may function as a trailer towed behind a motorized vehicle, be towed by a person, or be self-propelled.

There are many forms of vehicles that have been used for carrying and dumping a variety of items. Many vehicles of this nature contain a relatively flat bed used to contain the articles in transit and a pivoting mechanism for slidably removing the articles from the bed. Such vehicles typically have all sets of wheels coupled to a vehicle chassis.

Various mechanisms have been employed to transfer cumbersome cargo from the transport vehicle. Manual unloading has been used. However, multitudes of pivoting mechanisms have been exploited to achieve the desired dumping. Placement of the pivot and the size of the dumping vehicle vary considerably throughout the prior art. Larger vehicles employ pneumatic cylinders and hydraulics to pivot the bed and allow for dumping of the articles transported.

Dumping carts and hinging trailers are known, including those of the following patents: U.S. Pat. No. 5,544,944 to Keech; U.S. Pat. No. 6,290,301 to Bockman; U.S. Pat. No. 3,833,263 to Jackson; U.S. Pat. No. 4,711,499 to Fortin; U.S. Pat. No. 4,889,390 to Campbell; and U.S. Pat. No. 5,395,163 to Mandell et al. The desirable elements of the present invention are neither taught nor disclosed in the prior art. The present invention is therefore a useful improvement upon the prior art of record.

SUMMARY OF THE INVENTION

A dumping utility cart of the present invention includes an article retaining bed having a front end and a rear end. The article retaining bed is pivotally attached to a chassis intermediate a front set of wheels and a rear set of wheels or alternatively, between a front axle and a rear axle, or further alternatively behind the rear set of wheels. The front set of wheels is rotatably attached to the chassis. Significantly, the rear set of wheels is rotatably attached to the article retaining bed proximate the rear therefore, and not to the chassis.

When it is desired to empty the contents of the dumping utility cart a locking means is unlocked to allow the article retaining bed to pivot with respect to the chassis. The contents subsequently are released from the article retaining bed through the assistance of gravity. The article retaining bed is designed to pivot up to approximately 90° in relation to the chassis, such that the floor of the article retaining bed is substantially perpendicular to the plane of the chassis and therefore, to the underlying ground plane.

Certain embodiments of the present invention provide a mechanical advantage that reduces the work required to rotate the retainer bed to the upright position. Conventional dual axle trailers typically have an effective pivot point that is either over or behind the rear axle. In contrast, the rear wheels of the present invention act as the sliding element in a crank-slider configuration and roll toward the front wheels as the bed is rotated from a horizontal carry position to a vertical dump position. The net effect of placing the pivot point between the axles is that the work required to rotate the bed is reduced.

Another advantage of the present invention is that unloading or dumping of the bed can be machine powered without resort to a dedicated power source or transfer mechanism. For example, the invention allows for a utility cart that is pulled by motor vehicle coupled to the tongue of the cart. If a payload is too heavy to unload by hand, the motor vehicle is then used to power the unloading. First, the rear set of wheels are blocked or otherwise braked. Then, operating the vehicle in reverse pushes the front set of wheels rearward toward the back set, thereby actuating the bed to the dump position without further human intervention.

A further advantage of certain embodiments of the present invention is that the pivot point on the chassis can be configured so that the front set of wheels and the rear set of wheels contact each other when the bed is fully extended in the upright or dumping position, thus providing a braking mechanism for the cart, as well as a mechanical stop that prevents overextension of the bed dumping structure.

The present invention is an articulated cart including a chassis, a bed pivotably coupled to the chassis, a set of front wheels operably coupled to the chassis, and a set of rear wheels operably coupled to the bed. The present invention is further a method of manufacturing an articulated cart and a method of dumping an articulated cart.

BRIEF DESCRIPTION OF THE DRAWINGS

FIG. 10 is a plan view of another embodiment of a chassis suitable for use with the dumping utility cart of this invention.

FIG. 11 is a side view of the chassis of FIG. 10.

FIG. 12 is a front view of the chassis is FIG. 10.

FIG. 13 is a plan view of another embodiment of a bed suitable for use with the dumping utility cart of this invention.

FIG. 14 is a side view of the bed of FIG. 13.

FIG. 15 is a front view of the bed of FIG. 13.

FIG. 16 is a plan view of another embodiment of a locking mechanism suitable for use with the dumping utility cart of this invention.

FIG. 17 is a side view of the locking mechanism of FIG. 16.

FIG. 18 is a front view of the locking mechanism of FIG. 16.

DETAILED DESCRIPTION

Figure 1:
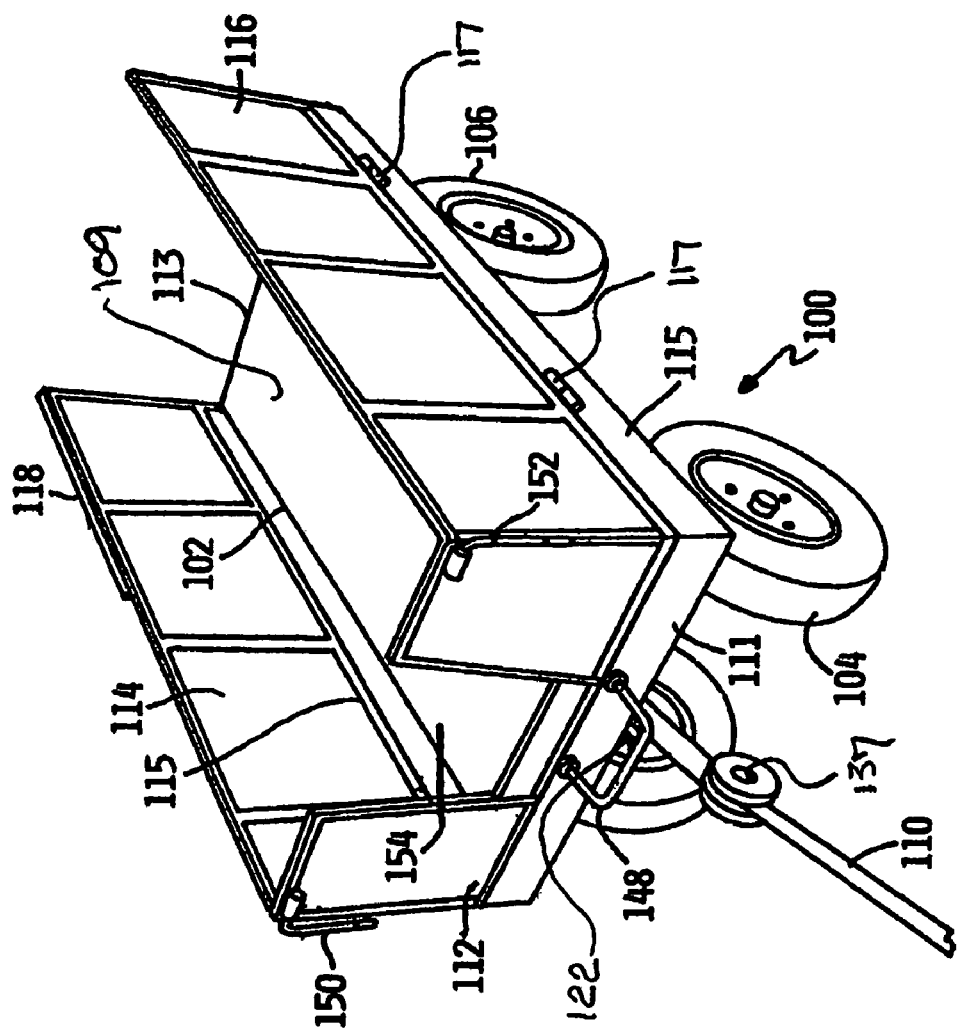
FIG. 1 is a perspective view of one embodiment of a dumping utility cart in a transport position.

Any references to such relative terms as front and rear, upper and lower, horizontal and vertical, or the like, are intended for convenience of description and are not intended to limit the present invention or its components to any one positional or spatial orientation. All dimensions of the components in the attached figures may vary with a potential design and the intended use of an embodiment of the invention without departing from the scope of the invention. Substantially similar features are designated by identical numbers.

This detailed description is intended to teach a person of skill in the art further details for practicing certain aspects of the present teachings and is not intended to limit the scope of the invention. Therefore, specific combinations of features and methods disclosed in the following detailed description may not be necessary to practice the invention in the broadest sense, and are instead taught merely to particularly describe representative embodiments of the invention.

A person of ordinary skill in the art will readily appreciate that individual components and features shown on various embodiments of the present invention are interchangeable and may be added or interchanged on other embodiments without departing from the spirit and scope of this invention.

Referring to FIGS. 1-9, a dumping utility cart of the present invention is generally designated in the drawings by the reference numeral 100. The dumping utility cart 100 includes an article retaining bed 102, a front set of wheels 104, a rear set of wheels 106, a chassis 108, and a tongue 110.

The dumping utility cart 100 of the present invention enables items to be readily transported and then dumped from the dumping utility cart 100 by pivoting the article retaining bed 102 with respect to the chassis 108. Because the chassis 108 is articulated, pivoting about a point that is located intermediate to the front set of wheels 104 and the rear set of wheels 106, the amount of force needed to pivot the article retaining bed 102 from the transport disposition to the dump position is greatly reduced when compared with prior art non-articulated utility carts.

The article retaining bed 102, depicted in FIG. 1, preferably may have a generally rectangular configuration with a front end 111, a rear end 113 and, and a pair of sides 115 that extend between the front end 111 and the rear end 113 and extend generally upward from a bed floor 109. However, a person of ordinary skill in the art will appreciate that it is possible to use the concepts of the present invention with alternative bed configurations.

The article retaining bed 102 preferably includes the bed floor 109 having a substantially flat upper surface. The rear end 113 is the rear margin of the bed floor 109. Depending on the size of the article retaining bed 102, reinforcing beams (not shown) may be provided around an outer edge of the article retaining bed 102 or extending across a central region of the article retaining bed 102 beneath the bed floor 109. The article retaining bed 102 is connected to the chassis 108 at pivot point 120 and at locking point 122, where pin 119 is shiftably engaged in a bore 123 defined the brace 121 of FIG. 7. The pivot point 120 is located at the rearward end of each side rail 119.

The article retaining bed 102 may be made of a variety of materials including, but not limited to steel, aluminum, wood, and molded composite plastic. A smooth, friction-reducing inner surface has been found suitable for the present invention. The friction-reducing inner surface allows for greater ease of dumping cumbersome articles contained within the bed 102 of the cart 100.

Figure 2:
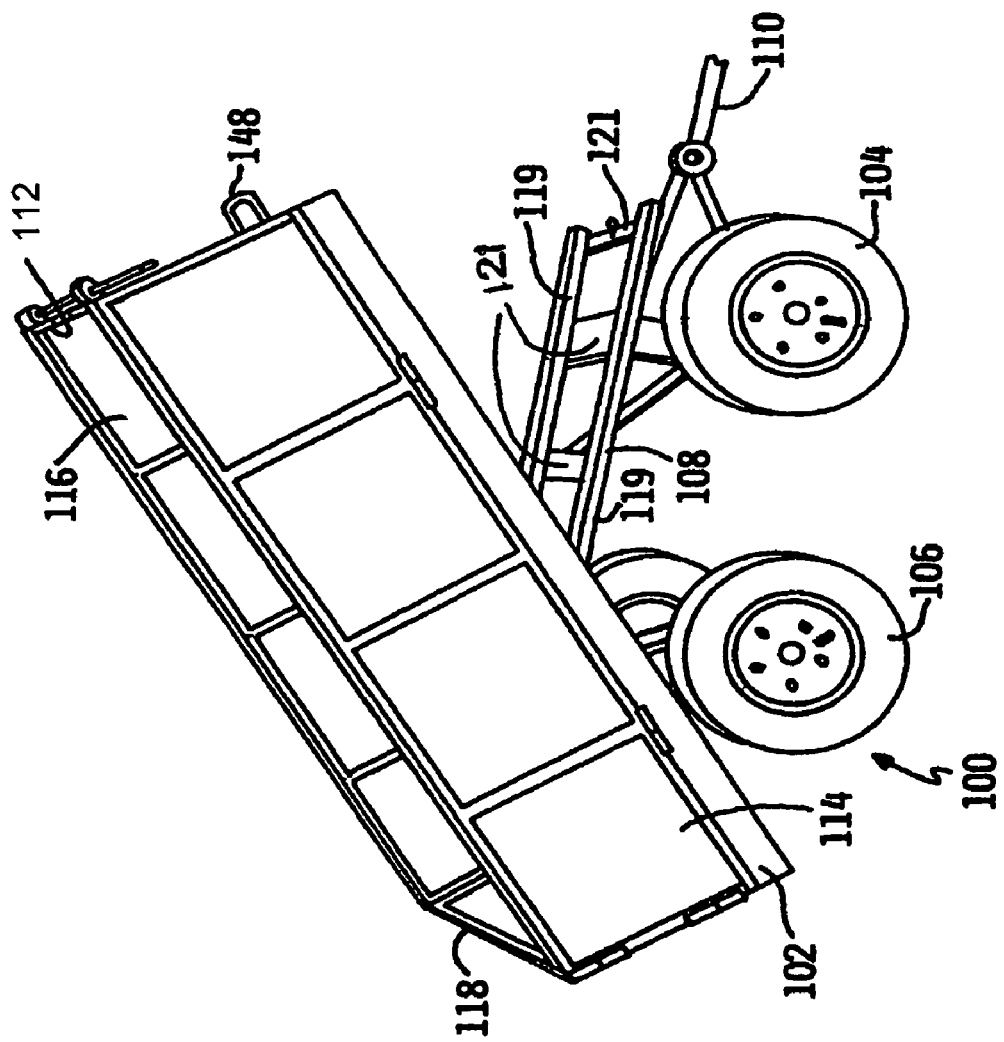
FIG. 2 is a side view of the dumping utility cart of FIG. 1 in a partially raised position.
Figure 3:
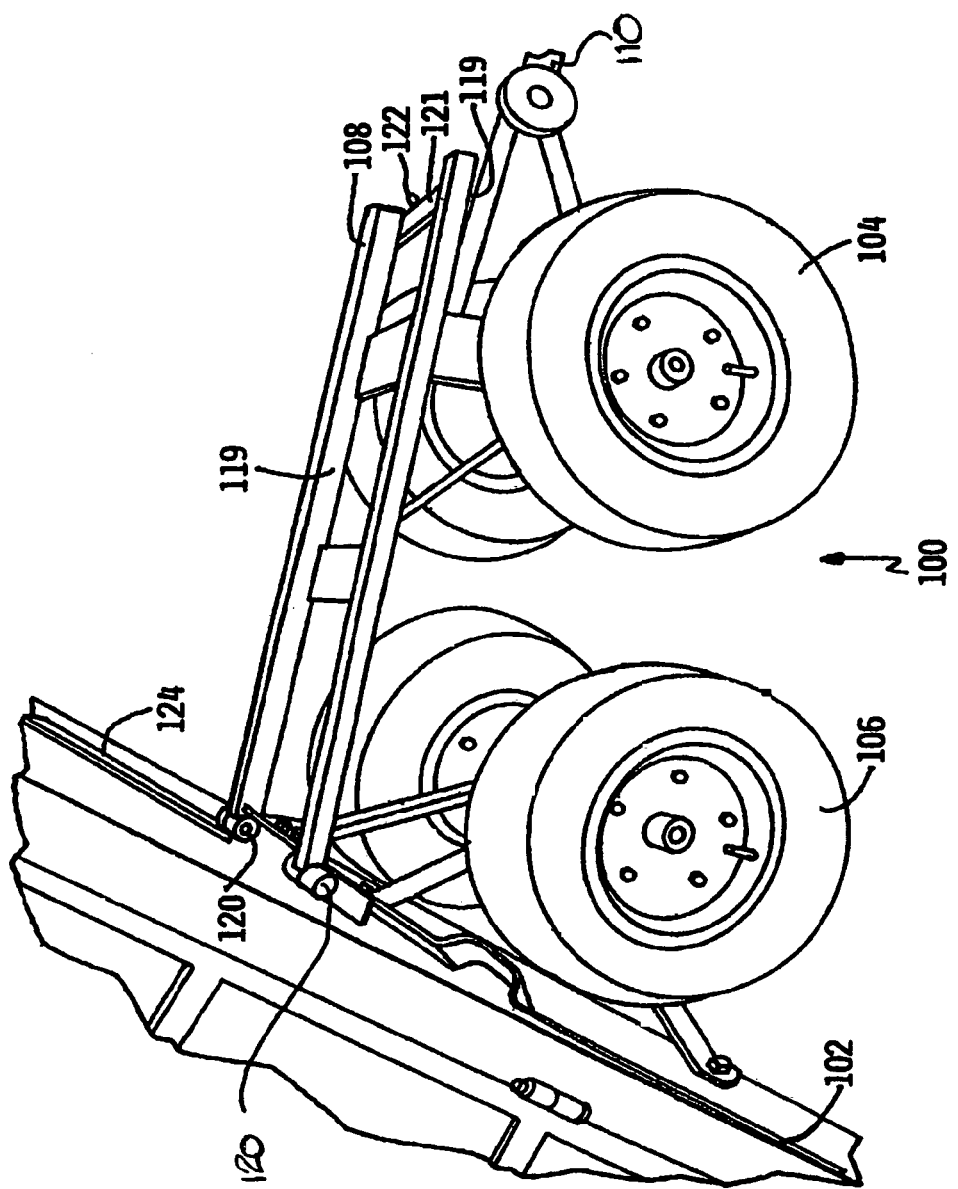
FIG. 3 is a side view of the dumping utility cart FIG. 1 in a fully raised position.

The chassis 108, depicted in FIGS. 2 and 3, preferably includes a pair of spaced apart, parallel side rails 119 and a plurality of transverse braces 121 that extend between the side rails 119. The configuration of the side rails 119 and the braces 121 is selected based upon the anticipated load that is to be carried by the cart 100, and is typically of heavier stock when heavier loads are anticipated.

The chassis 108 is pivotally connected to the article retaining bed 102 for greater ease of dumping cumbersome articles. Proper positioning of the pivot point 120 in relation to the sets of wheels 104, 106 and to the article retaining bed 102 better enables a person to use the articulated cart 100 for dumping of heavy material. When properly positioned, the rear wheels 106 rotate under the article retaining bed 102 in the manner similar to that of a shifting fulcrum. It should be noted that a rearward portion of the bed 102 extends beyond the chassis 108 and the pivot point 120.

By acting in this manner, a relatively small amount of upward rotational force may be employed to pivot the article retaining bed 102, since the weight of the material in the bed 102 that is rearward of the pivot 120 acts to assist in the dumping rotation. As shown in FIG. 2, the pivot assisting handle 148 is employed to initiate the dumping process and to pivot the article retaining bed 102. In the process of the articulated dumping, the wheel base (the distance between the two sets of wheels 104, 106) decreases as a result of the articulated pivoting action.

Figure 4:
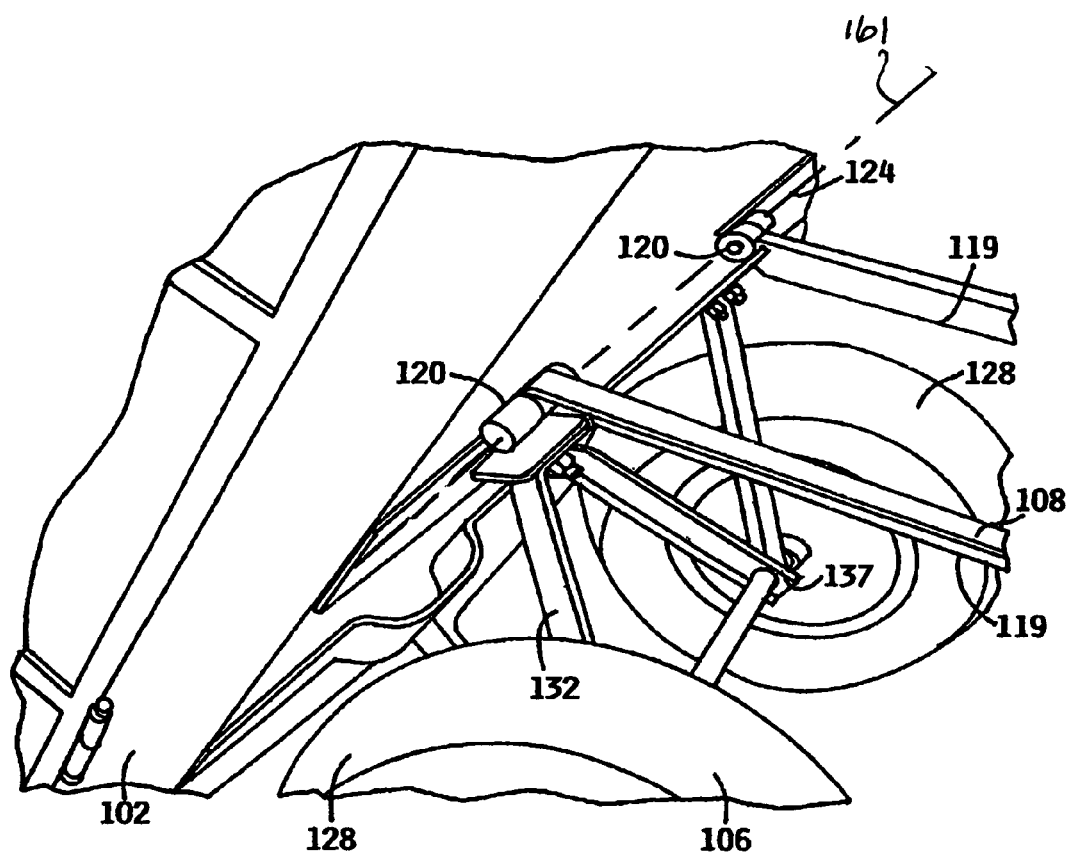
FIG. 4 is a close-up view of the dumping utility cart as shown in FIG. 3.
Figure 5:
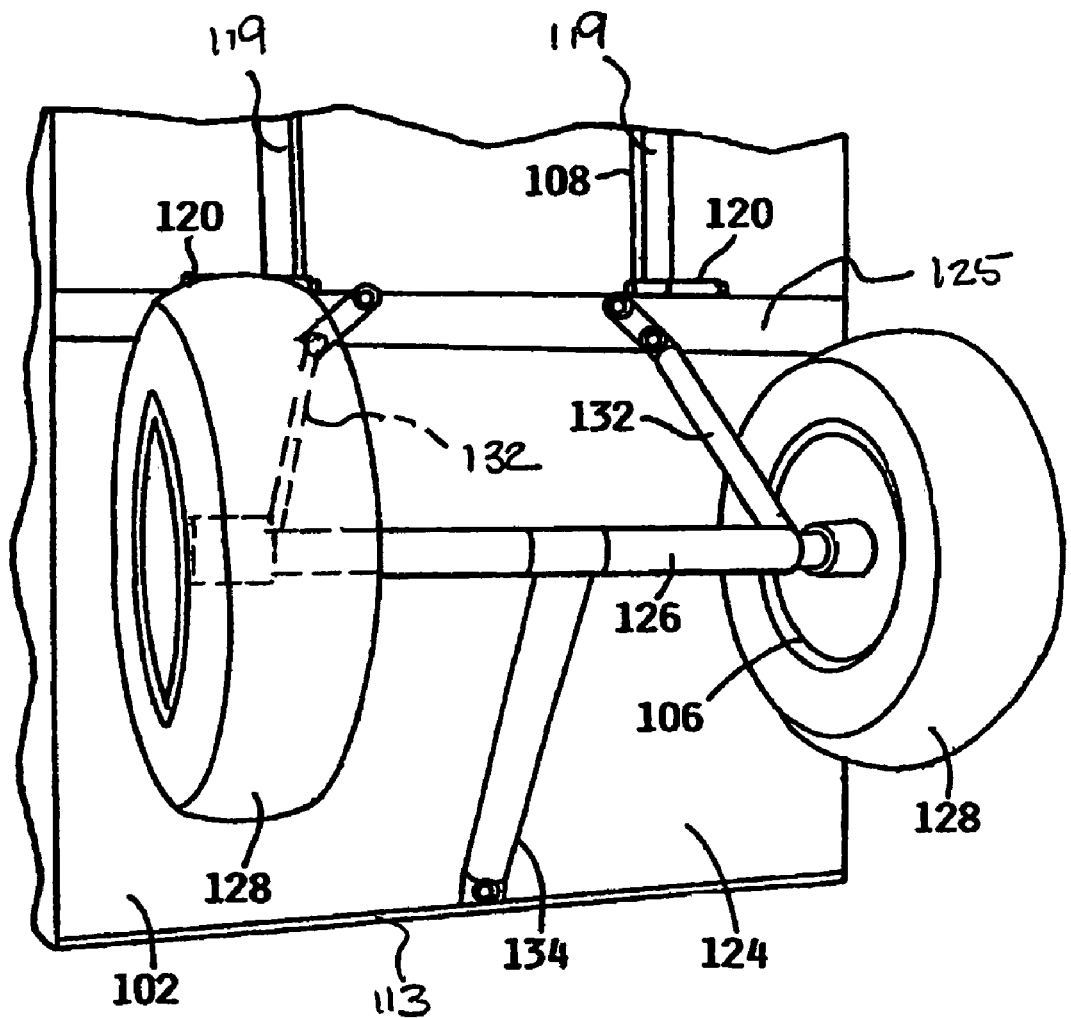
FIG. 5 is a bottom view of a rear set of wheels.

The rear set of wheels 106 are fixedly attached to the underside 124 of the article retaining bed 102, as most clearly illustrated in FIGS. 3-5. Significantly, the rear set of wheels 106 are not attached to the chassis 108, as in prior art carts. The rear wheels 106 rotate about a rear axle 126. The length of the rear axle 126 may be less than the width of the article retaining bed 102. Tires 128 with inflatable inner tubes have been found to be most suitable for use as the rear wheels 106.

To increase stability and durability, the set of rear wheels 106 are fixedly attached to the underside 124 of the article retaining bed 102 by at least one, but preferably two forward braces 132, at least one rear brace 134 and at least one intermediate brace 137.

The forward braces 132 extend from the rear axle 126 to the underside 124 of the article retaining bed 102 proximate the pivot point 120 at an angle of approximately 45 degrees to the axle 126. The forward braces are bolted to a crossmember 125 attached to the underside 124. The at least one rear brace 134 extends from the rear axle 126 to the underside 124 of the article retaining bed 102 proximate the rear end 113 at an angle of approximately 45 degrees to the bed 102. The intermediate brace 137 extends substantially perpendicular from the underside 124 of the article retaining bed 102 to the rear axle 126.

Figure 6:
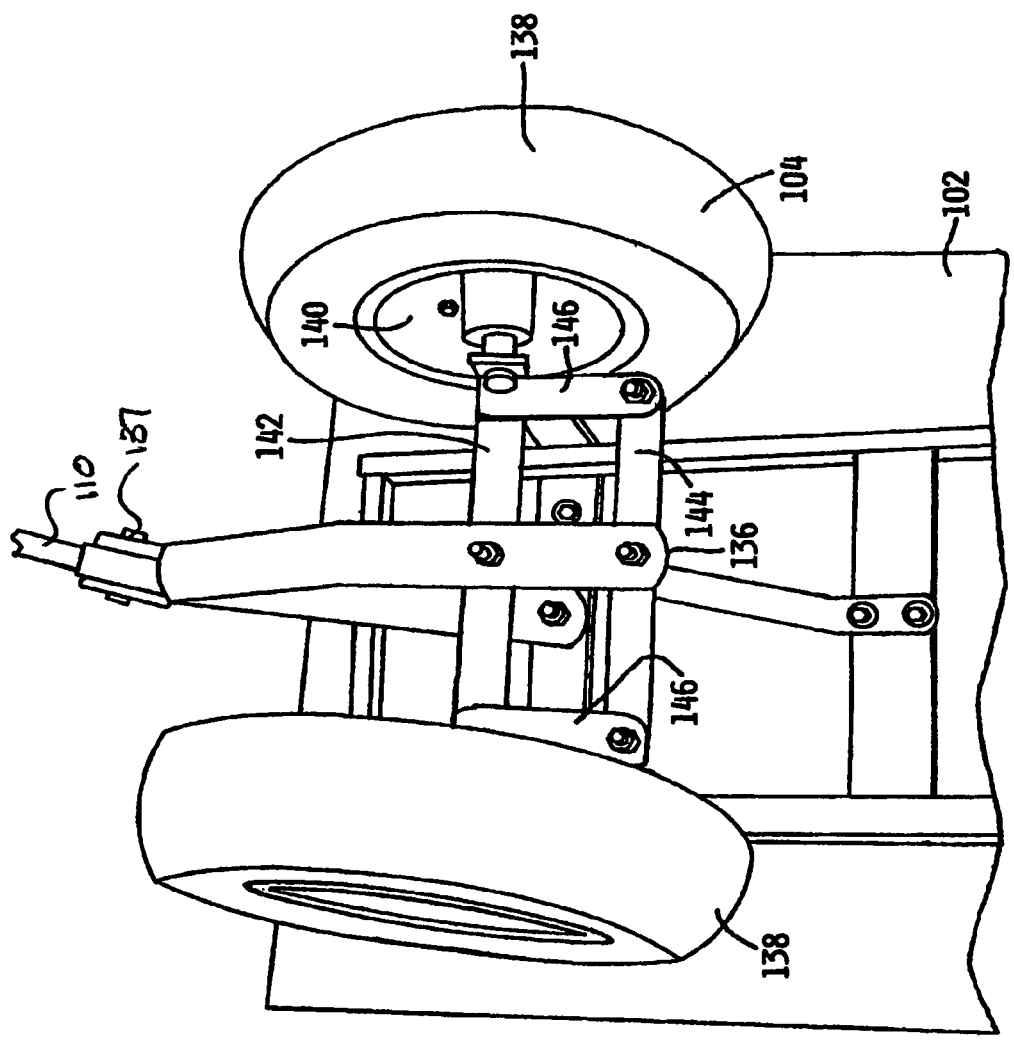
FIG. 6 is a bottom view of a front set of wheels.
Figure 7:
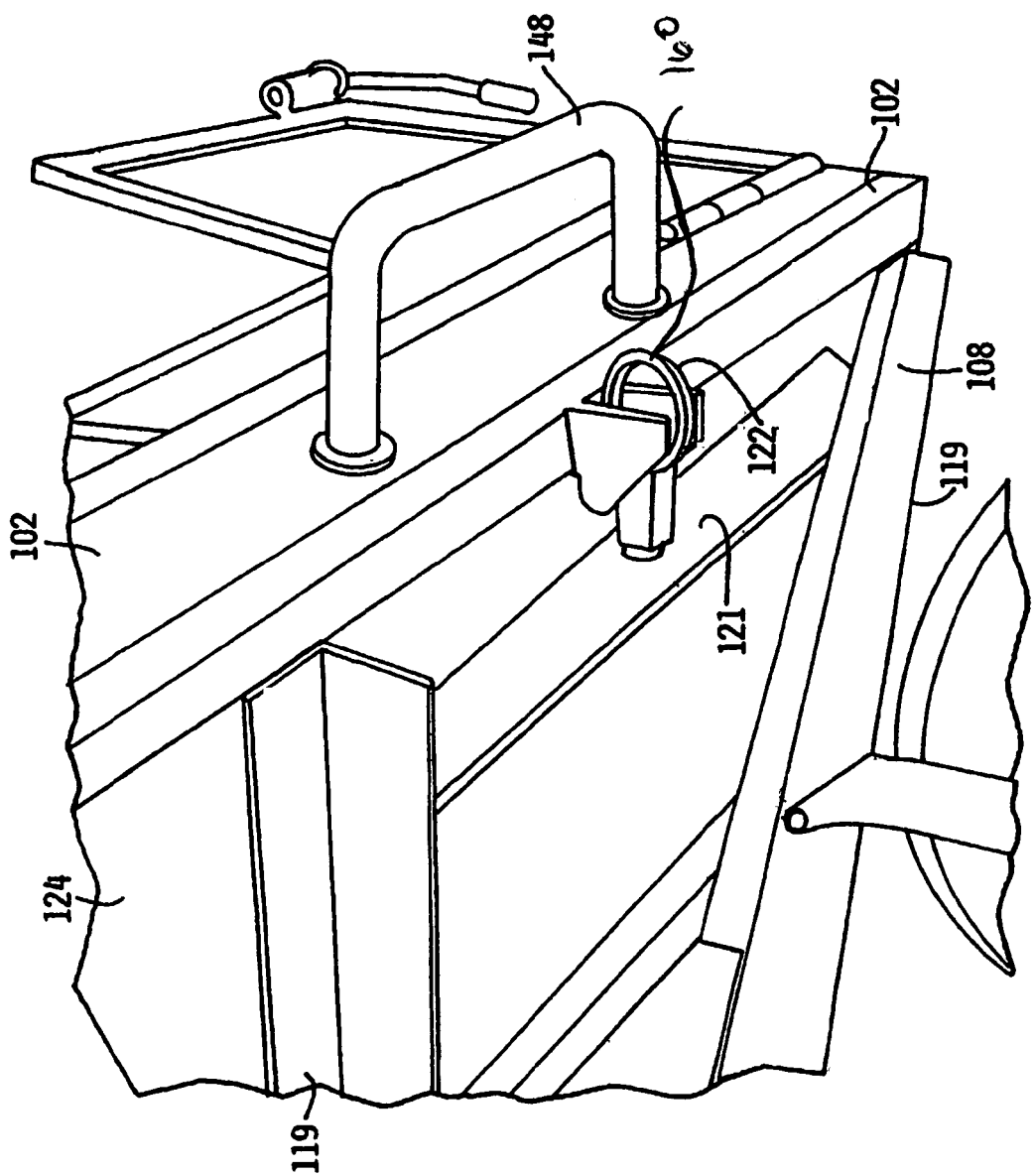
FIG. 7 is a perspective view of a first locking means.

The front set of wheels 104 are operably pivotably attached to the chassis 108, as most clearly illustrated in FIG. 6. The front set of wheels 104 preferably comprises inflatable tires 138 and rims 140. The front set of wheels 104 are rotatably attached to a steering mechanism 136. The steering mechanism 136 comprises an axle bar 142, a pivot bar 144, and a set of connector bars 146.

The set of front wheels 104, both rotate about the axle 142 and the axle 142 pivots relative to the bed 102 and chassis 108 in order to provide steering of the cart 100. The connector bars 146 are parallel to the direction of travel and pivotally attached to the axle bar 142 and the pivot bar 144. The connector bars 146 are proximal to the set of front wheels 104. The axle bar 142 is located in the axis of rotation for the front wheels 104 and is fixedly attached to the chassis 108 proximal to the front set of wheels 104.

The tongue 110 is pivotally attached to the steering mechanism 136 at pivot 137. The tongue 110 may include a detachable mechanism 145 (see FIGS. 8 and 9) that permits the tongue 110 to either be pulled by hand or attached to a tractor using a clevis.

Figure 8:
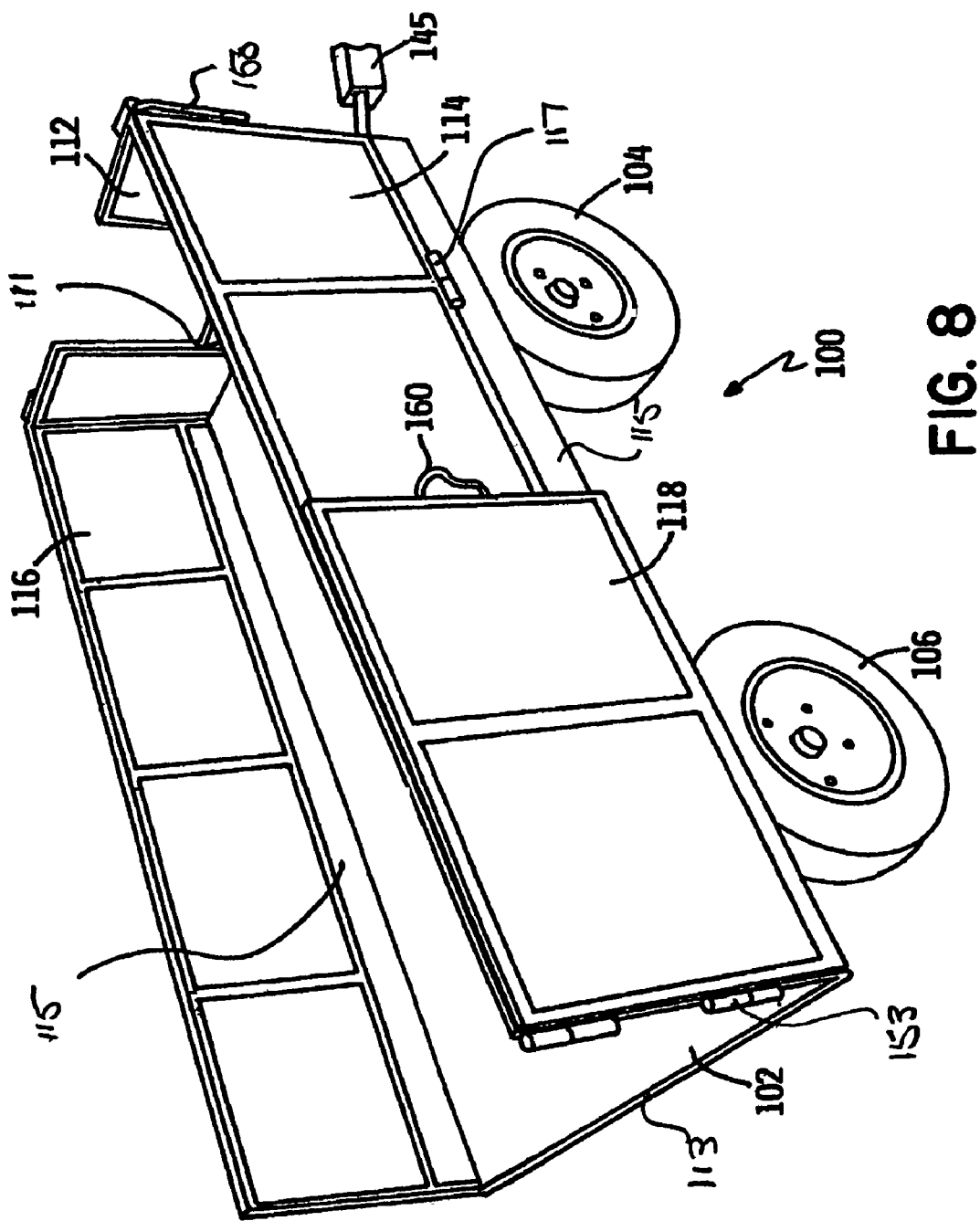
FIG. 8 is a perspective view of the dumping utility cart of FIG. 1 with the end wall engaged by a second locking means.
Figure 9:
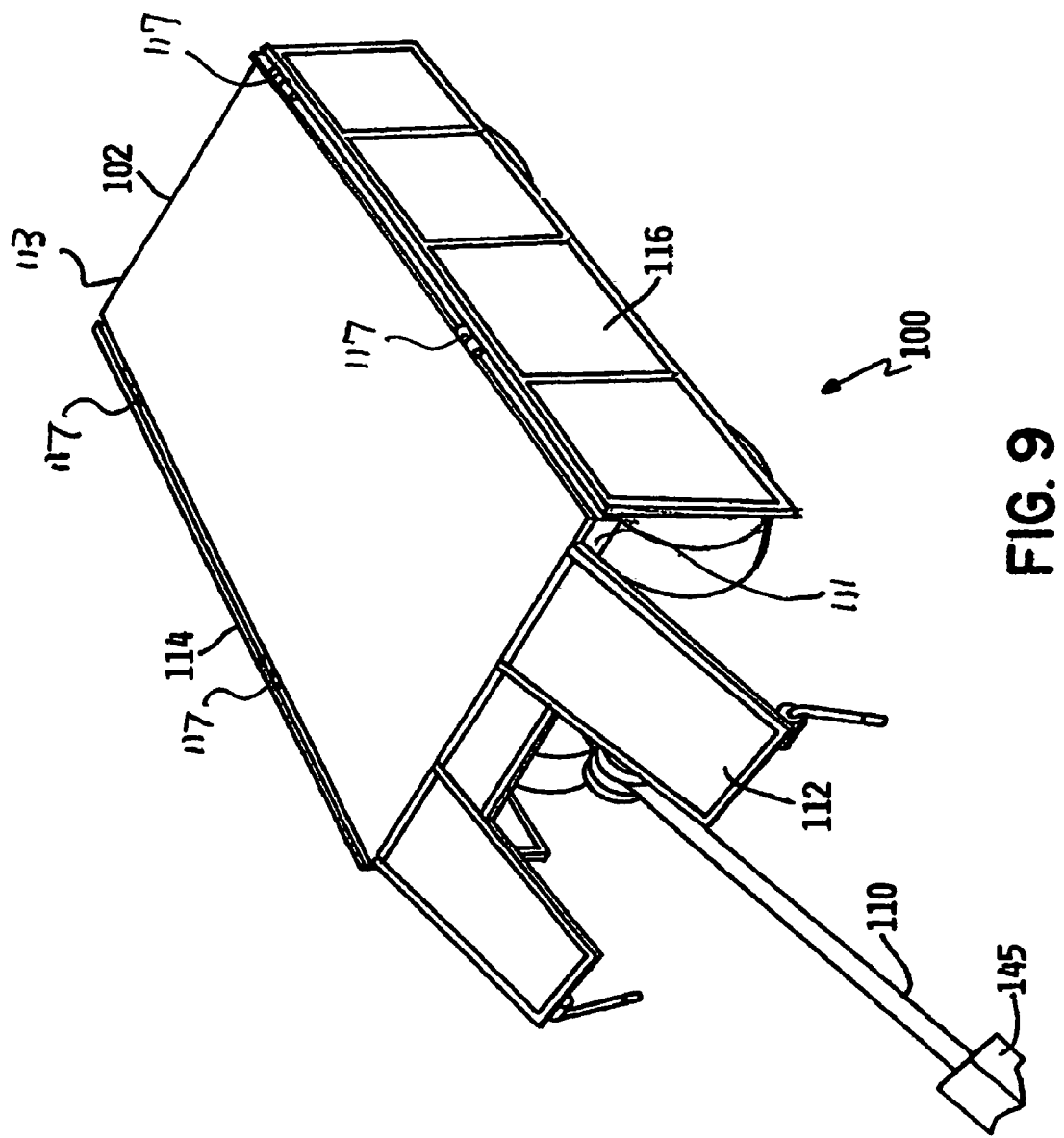
FIG. 9 is a perspective view of the dumping utility cart of FIG. 1 with side and end walls in downward position.

As depicted in FIG. 8, to increase the capacity of the dumping utility cart 100, the article retaining bed 102 preferably has a front end wall 112, a pair of opposing side walls 114, 116, and a rear end wall 118. The front end wall 112, the side walls 114, 116 and the rear end wall 118 are preferably pivotable between an upwardly extending orientation (illustrated in FIG. 1) and a downwardly extending orientation (illustrated in FIG. 9) by means of hinges 117.

The front end wall 112 is preferably pivotally attached to the upper margins of the floor 111 of the article retaining bed 102. The front end wall 112 spans the width of the cart 100. A steering handle slot 154 may be preferably cut out of the front end wall 112 to allow downward pivot of the front end wall 112 while maintaining substantially free movement of the tongue 110. A pivot assisting handle 148 is positioned beneath the front end wall 112 on the front end of the dumping utility cart 100, equidistant from the ends of the article retaining bed 102, as most clearly illustrated in FIG. 7. The side walls 114, 116 may also be fixedly attached to the front end wall 112 by wall connectors 150, 152, as depicted in FIG. 1.

The rear end wall 118 (see FIG. 8) is preferably pivotally attached to one of the side walls 114 by means of hinges 153. The rear end wall 118 may also be pivotally attached to the article retaining bed 102. FIGS. 1 and 8 illustrate the rear end wall 118 in a locked open position parallel with and outward of the side wall 114. Various locking mechanisms may be employed to retain rear end wall 118 in the locked open position. An engaging cotter pin 160 has been found particularly well suited for the locking means to lock the rear end wall 118 to the side wall 114.

Through the use of wall connectors 150, 152, the front end wall 112 and side walls 114, 116 act as mutual support members. A number of mechanical devices may be employed as the wall connectors 150, 152, including but not limited to cotter pins, frictionally engaging hooks, and ball and socket joints.

The articulated cart 100 may be positioned and steered through the use of the tongue 110. As noted above, the tongue 110 is pivotally attached to the steering mechanism 136. This connection allows for the user to easily turn the dumping utility cart 100, as the front set of wheels 104 turn in unison by means of the steering mechanism 136. The pivotal attachment 137 allows for users of various height and arm length to steer and pull the articulated cart 100 with greater comfort and ease.

In operation, the tongue 110 is used to move the dumping utility cart 100 to a desired location. As the dumping utility cart 100 is being moved, the first set of wheels 104 rotate about a first axis coincident with axle 142 and the second set of wheels 106 rotate about a second axis coincident with axle 126.

An individual may dump a load of material by first unlocking the locking means 122 by pulling forward on ring 160 to disengage pin 119 from bore 123 in cross member 121. After this disengagement, an upward force exerted upon the pivot assisting handle 148 will initiate the dumping operation by pivoting the article retaining bed 102 about a third axis, the third axis being a transverse axis 161 defined through the two pivots 120 (see FIG. 4). An upward force may be exerted up to the point in which the article retaining bed 102 is substantially perpendicular to the ground, as shown in FIGS. 3 and 4.

A further embodiment of the chassis of this invention is shown in FIGS. 10-12 generally at 170. Chassis 170 may be employed in place of previously described chassis 108. Chassis 170 has side rails 172 and 174, which are held apart and reinforced by braces 176 and 178 extending between the side rails 172 and 174. The side rails 172 and 174 may have an L-Shaped cross-section with respective vertical members 180 and 182 horizontal members 184 and 186. The brace 176, in turn be L-Shaped and may include respective horizontal and vertical members 188 and 190. Bores 192 and 194 may be defined in the vertical member 190.

Another embodiment of the previously described bed 102 is shown in FIGS. 13-15 generally at 200. Bed 200 may be used in conjunction with the chassis 170 of FIGS. 10-12. In the embodiment depicted, the bed 200 is integrally (or otherwise unitarily) formed, having a front end wall 202, a left side wall 204, a right side wall 206, a rear end wall 208, and a bed floor member 210. At least one inboard ridge 212 may be formed in the bed member 210 to provide longitudinal strength and rigidity. In the embodiment shown, two additional inboard ridges 214, 216 are depicted. The bed member 210 may also be formed with at least one outboard ridge; outboard ridges 218 and 220 being depicted. The outboard ridges 218 and 220 may be dimensioned and located to accommodate the side rails 172 and 174 of the chassis 170 when the bed 200 is in a generally horizontal engaged orientation with respect to the chassis 170. The outboard ridges 218 and 220 further enhance the longitudinal strength and rigidity of the bed 200. Additionally, when the side rails 172 and 174 of the chassis 170 are seated in the outboard ridges 218 and 220, the side rails 172 and 174 further enhance the longitudinal strength and rigidity of the bed 200 and prevent lateral displacement of the bed 200. The chassis 170 thus matingly accommodates the bed 200 when in an engaged, generally horizontal position.

The side walls 204 and 206 and the front and rear end walls 202 and 208 of the bed 200 are shown as being stepped and sloped outwardly from bottom to top. Such stepping enhances the rigidity of the bed 200 and the sloping aids in dumping material disposed in the bed 200. However, a person of ordinary skill in the art will readily comprehend that several configurations may be suitable for the front, rear, and side walls, the choice of any specific configuration determined by such factors as user preference and load design. Moreover, a person of ordinary skill in the art will readily comprehend that the bed 200 is adaptable to be utilized with the chassis 108.

An embodiment of a locking mechanism suitable for use with this invention is depicted in FIGS. 16-18 at 224 and includes a first upper bracket 226, a second lower bracket 228, a generally U-shaped latching member 230, and springs 232. The first bracket 226 in cross-section is L-Shaped and has a vertical element 236 intersecting with a horizontal element 238. The horizontal element 238 is fixedly coupled to the upper margin of lower bracket 228. Bores 240 and 242 may be formed in the vertical element 236. The bores 240 and 242 may be sized and positioned to align with bores 192 and 194 of the brace 176 when the locking mechanism 224 is mounted thereto by means of bolts disposed in respective bore pairs 240, 192 and 242, 194.

The second bracket 228 has an inverted U-shape cross-section (see FIG. 17) with vertical elements 246 and 248 depending from a horizontal element 250. Bores 252 and 254 are formed in the vertical element 246 and bores 256 and 258 are formed in vertical element 248 to shiftably accommodate the latch member 230.

The latch member 230 unitarily, or otherwise integrally, has arm elements 262 and 264 extending from a base element 266, the arm elements 262 and 264 beveling at respective tips 268 and 270. When assembled, the arm elements 262 and 264 are each disposed coaxially within one of the springs 232 and one end of the springs 232 is attached to the arm elements 262 and 264 at points 272 and 274. The springs 232, in turn, are disposed between the vertical elements 246 and 248 and so that the spring 232 biases the latch member 230 in the direction of the arrow 278 in an engaged disposition. When released, the biased spring 232 acts to return the latch member 230 to the position depicted in FIG. 17, thereby forcing the latch member 230 back to the engaged position depicted in FIGS. 16 and 17. Withdrawing the latch member 230 in the direction opposite to the direction of arrow 278, acts to disengage the locking member 230.

The locking mechanism 224 may be mounted to the brace 176 such that the tips 268 and 270 are seated in brackets attached to the bed 102 or 200. Alternatively, the locking mechanism 234 may be mounted to the bed 102 or 200 such that the tips 268 and 270 are seated and secured in the chassis 108 or 170 in a manner similar to that depicted in FIG. 7. A person of ordinary skill in the art will readily comprehend how to operably mount the locking mechanism 224 to secure the instant bed to the instant chassis without undue experimentation. Additionally, the base 266 may also serve as a handle when the instant bed is to be tilted to dump the contents thereof. A person of ordinary skill in the art will readily understand that the locking mechanism 224 could be advantageously utilized with the bed 102 and the chassis 108 without undue experimentation.

Figure 19:
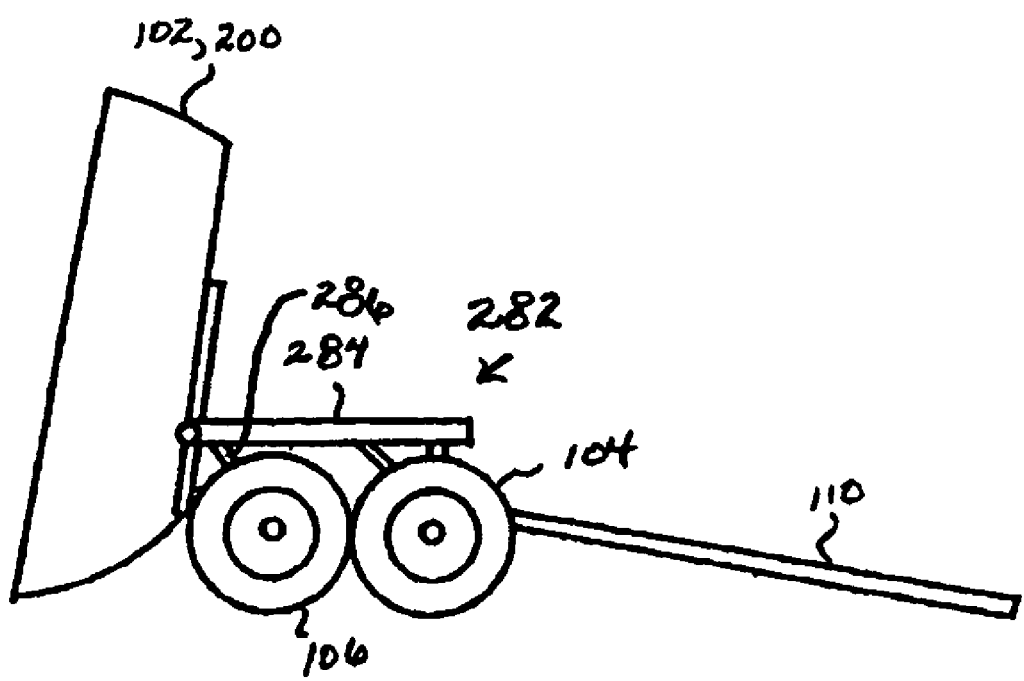
FIG. 19 is a side view of another embodiment of the dumping utility cart of this invention.

A further embodiment of the dumping cart of this invention is shown generally in FIG. 19 at 282. The cart 282 has a shortened chassis 284 and/or an altered rear wheel brace assembly 286, wherein lengths of the forward brace 132, rear brace 134, and intermediate brace 137, as depicted in FIGS. 4 and 5, are extended. The shortened chassis 284 and/or altered rear wheel brace assembly 286 enable a contacting relationship between the front wheel set 104 and the rear wheel set 106 when the bed of the cart 282 is pivoted into an unloading position is depicted in FIG. 19. The contacting relationship between the front wheel set 104 and the rear wheel set 106 acts as a brake, advantageously preventing or greatly limiting forward or rearward movement of the cart 282 when the contents thereof are being unloaded. The wheel sets 104 and 106 are pivoted out of contact to a disposition as depicted in FIG. 1, when the bed 200 is pivoted toward the chassis 284 after the contents are unloaded to allow the cart 282 to be moved and steered.

Figure 20:
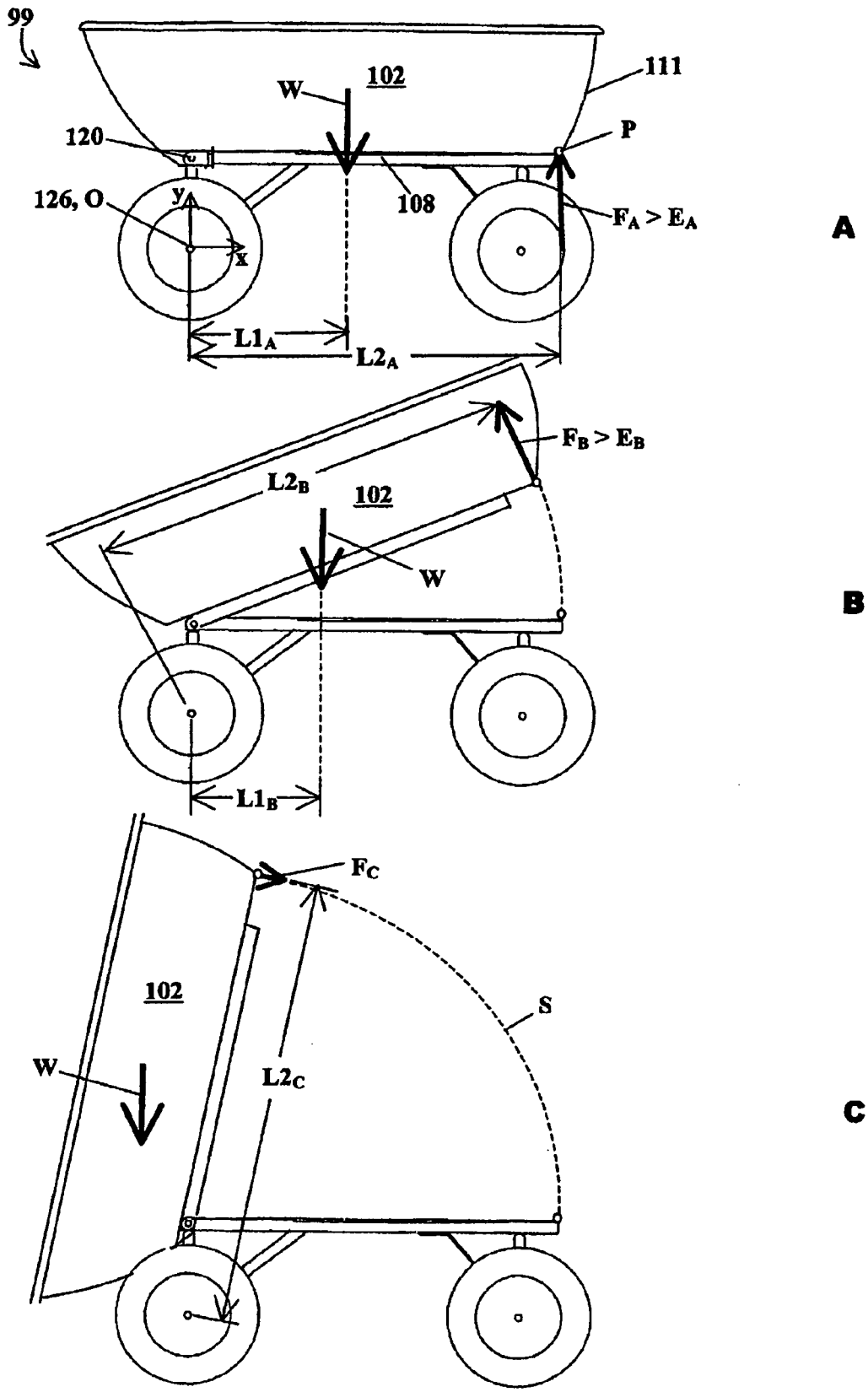
FIGS. 20A-C are side views of a dumping utility cart with an alternative design.
Figure 21:
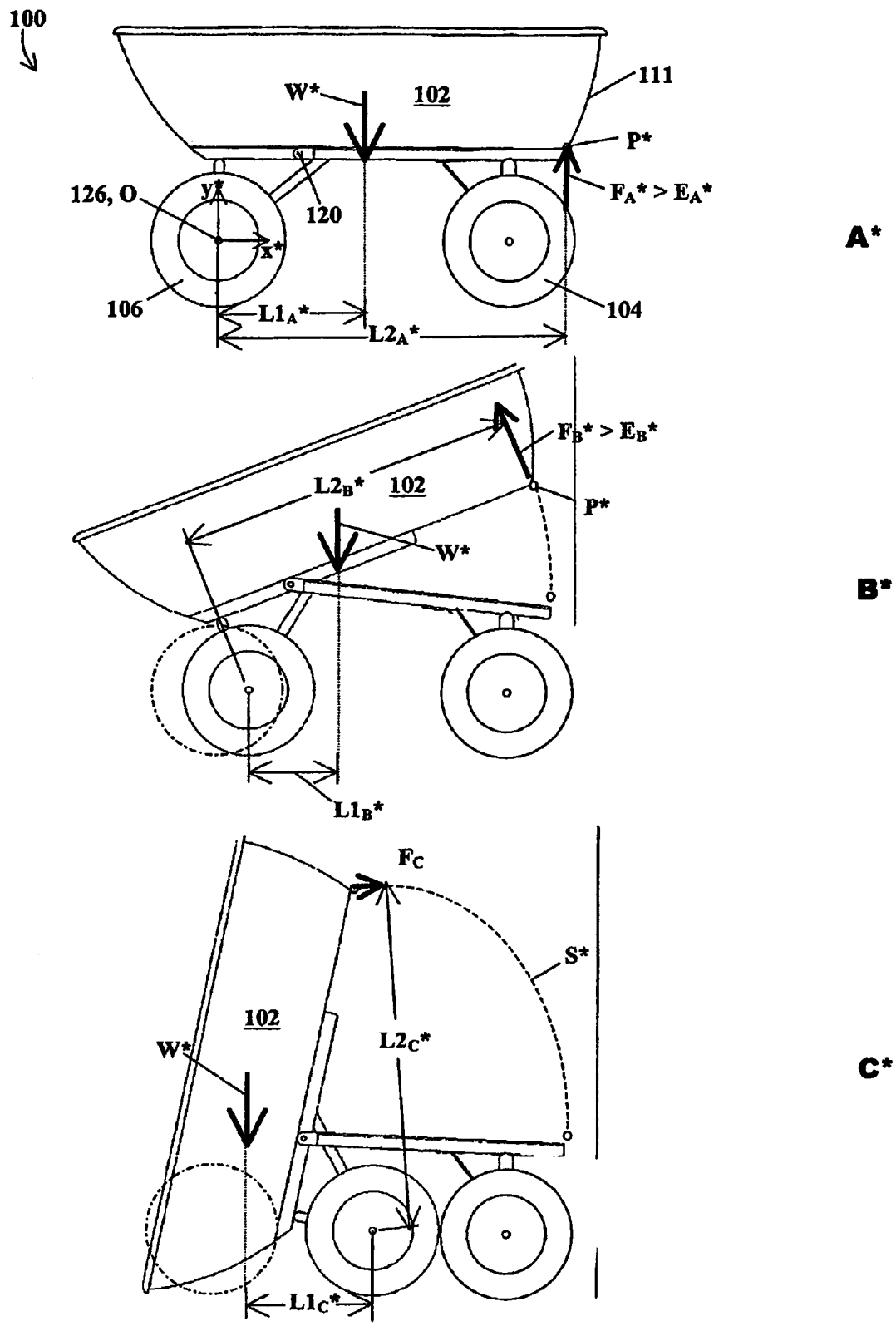
FIGS. 21A*-C* are side views showing force vectors and associated vector angles of the dumping utility cart of this invention.

Referring to FIGS. 20 and 21 and without being limited by any particular underlying theory or explanation, the mechanical advantage that the present invention provides over an alternative design is explained. FIG. 20 depicts a dumping utility cart 99 of an alternative design in three progressive positions A, B and C as the dumping utility cart 99 is moved from retaining position A to dumping position C. The pivot point 120 is located above the rear axle 126. An x-y coordinate system is shown with the x-direction in the horizontal direction and the y-direction in the vertical direction. An origin O for the x-y coordinate system is arbitrarily chosen at the rear axle 126. The retaining bed 102 contains a distributed payload (not shown) that is represented by a single weight vector W located in the middle of retaining bed 102. In position A, the bed is at rest on the chassis 108 and the weight vector W acts at a horizontal distance $L1_A$ from the origin O, as shown in position A of FIG. 20. A force application point P as been arbitrarily chosen at the base of the front end 111, and is located a distance $L2_A$ from the origin O in the x-direction.

A lifting force $F_A$ is applied to force application point P. To lift the retaining bed 102 from the chassis 108, the lifting force $F_A$ must exceed an equilibrium force $E_A$. The equilibrium force $E_A$ is computed by taking the sum of the moments $\Sigma M_O$ about the origin O and solving for $E_A$ such that $\Sigma M_O$ is zero. Generally, a moment $M_O$ about origin O is defined as the product of a force vector F and a distance L from the origin O. The magnitude of L is defined as the minimum distance between the trajectory of vector F and origin O. In position A, the weight vector W and the lifting force $F_A$ are both acting normal to the x-axis, thus making the minimum distances $L1_A$ and $L2_A$ measure in the horizontal or x-direction. The equilibrium force $E_A$ at position A of FIG. 20 is calculated as follows:

$$\Sigma M_O = -W \cdot L1_A + E_A \cdot L2_A = 0 \Rightarrow E_A = W \cdot L1_A / L2_A$$

Note that a negative sign has been assigned to W because W is acting downward, or in the "negative y" direction.

The same analysis applies at each point along a trajectory or arc S that is traced by load application point P as the retaining bed 102 progresses toward position C:

$$E_i = W \cdot L1_i / L2_i$$

where the footnote i denotes an arbitrary point along trajectory S. It is noted that the weight vector W, being caused by gravity, will always act in the negative y direction and thus be normal to the x-axis; hence, as the retaining bed 102 is rotated away from position A, the distance from origin O normal to W decreases as the weight vector W moves toward the y-axis.

Position B illustrates the analysis at an intermediate position. An equilibrium force $E_B$ required to hold the retaining bed 102 in position B is expressed by $$E_B = W \cdot L1_B / L2_B$$

Note that the distance $L1_B$ at position B is less than the distance $L1_A$ at position A, because weight vector W has moved toward the y-axis. Furthermore, the length $L2_B$ normal to lifting force $F_B$ increases because of the eccentricity between the pivot point 120 and the rear axle 126. Hence, the equilibrium force $E_B$ is less than the equilibrium force $E_A$ by virtue of both a decrease in the numerator and an increase in the denominator of the $E_B$ expression relative to the $E_A$ expression. For this reason, as the lifting force $F_B$ required to move the retaining bed 102 through position B is less than the initial lifting force $F_A$.

As the retaining bed 102 approaches position C of FIG. 20, the analysis becomes more nuanced. For the article of FIG. 20, at some point along trajectory S (not shown) the weight vector W passes over the rear axle 126, causing the length $L1_i$ to go to zero, resulting in an equilibrium force $E_i$ of zero. Beyond this point but before reaching position C, the equilibrium force $F_i$ must act in an opposite direction to maintain equilibrium.

"Virtual work" is the mathematical product of a force applied to a body and the displacement of the body. For FIG. 20, the virtual work U required to rotate the retaining bed 102 from position A to position C is computed by integrating the force $F_S$ applied to the force application point P as it progresses along trajectory S from point A to point C:

$$U = \int_A^C F_S \cdot dS$$

Turning now to FIG. 21, the same analysis is applied to an embodiment of the present invention. The variables in FIG. 21 are distinguished by an asterisk (*) superscript to distinguish them from the FIG. 20 counterpart in the following discussion. Note that the pivot point 120 in position A* is located between the rear axle 126 and the front wheels 104. Note also that the weight vector W* and lengths $L1_A^*$ and $L2_A^*$ are the same as in position A of FIG. 20, so the initial lifting force $F_A^*$ required to lift retaining bed 102 is the same as in FIG. 20.

However, as the retaining bed 102 is rotated to position B*, the rear wheels 106 roll forward (shown in phantom), resulting in a length $L1_B^*$ that is shorter than the length $L1_B$ of FIG. 20. Accordingly, the equilibrium force $E_B^*$ is less than the $E_B$ of the FIG. 20 counterpart. In this way, the rear wheel assembly acts akin to a classical "crank-slider" mechanism, providing the attendant mechanical advantages. (It is acknowledged that in the particular embodiment illustrated, the length $L2_B^*$ is shorter than the length $L2_B$ of FIG. 20, which will tend to counter the mechanical advantage of the shorter length $L1_B^*$; however, by adequate design optimization, the deleterious effects of the shorter length $L2_B^*$ can be minimized, thus preserving the mechanical advantage that the present invention provides.)

The mechanical advantages of the FIG. 21 embodiment not only provides a reduction in the force requirements, it also reduces the displacement required to rotate the retainer bed from position A* to position C*. Consider the mathematical expression for the virtual work U* corresponding to FIG. 21:

$$U^* = \int_{A^*}^{C^*} F_S^* \cdot dS^*$$

Again, because rear wheels 106 are moving toward front wheels 104, arc S* is not as long as arc S in FIG. 20. Hence, the virtual work U* required to go from position A* to position C* is reduced in two ways: first, because the $F_S^*$ term is reduced, and second because the arc length integrated over dS* is reduced.

It is further noted that the present invention can be designed so that the rear wheels contact the front wheels when the retaining bed 102 is in the dumping position, as shown in position C* of FIG. 21. This feature provides a braking means that prevents the dumping utility cart 100 from rolling away while in the dumping position. It also provides a mechanical stop that prevents an operator from rotating the bed further than safety or mechanical stresses permit.

Figure 22:
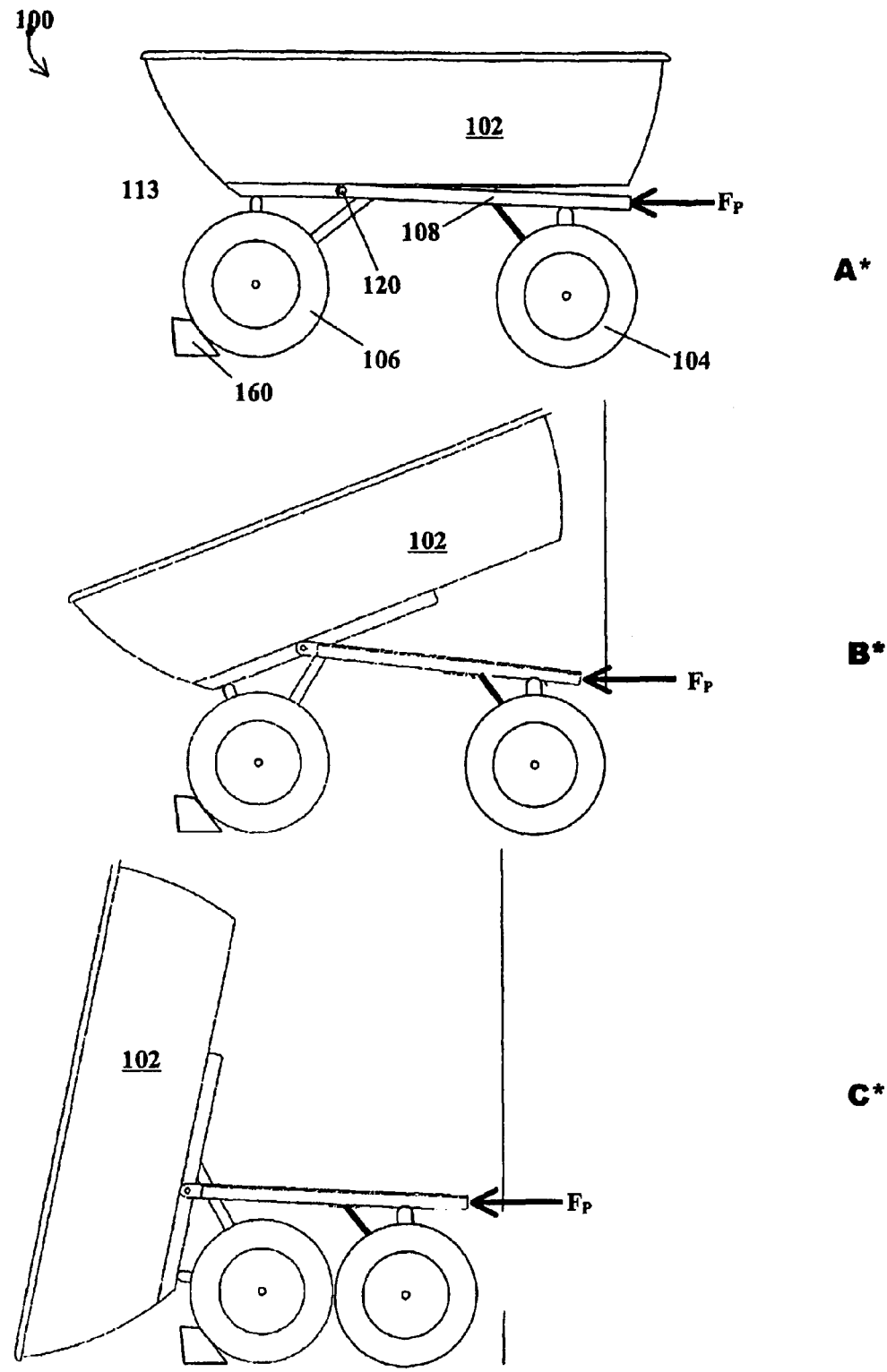
FIGS. 22 A*-C* are side views depicting another embodiment of the dumping utility cart of this invention.

Referring to FIG. 22, another embodiment of the invention is presented that allows for an alternate means of extending the dumping utility cart 100 to the dumping position. The force applied in FIG. 21 was substantially normal to the bottom surface of retainer bed 102. The FIG. 22 arrangement is configured so the chassis 108 is slightly canted with respect to the plane of the retaining bed 102 when in the resting position A*. The canted arrangement biases the structure so that when a pushing force $F_P$ is applied in a substantially horizontal direction against chassis 108, a moment is generated about the pivot point 120 that causes the chassis 108 and the rear end 113 of retaining bed 102 fold downwards about the pivot point 120. The retainer bed 102 thus rotates from position A* through position B* to position C*. A stop 160 is placed behind rear wheels 106 to prevent the trailer from rolling backwards when the pushing force $F_P$ is applied. (Alternatively, a brake could be provided that locks rear wheels 106). The dumping utility cart 100 can thus be unloaded by any means capable of exerting a pushing force $F_P$, such as by motor vehicle. The ability to use a motor vehicle for this purpose allows the dumping of heavier payloads without resort to a dedicated power source such as a hydraulic ram or an electric motor.

In the pivoting process, the third axis of the cart of this invention is moved from a location outside the first axis and the second axis to a position that is between the first axis and the second axis or alternately is displaced so as to achieve a shorter wheel base length when the bed is being pivoted for unloading. As a result of this configuration, the amount of force needed to dump the dumping utility cart of this invention is significantly reduced when compared to prior art utility carts.

In an alternative embodiment not shown, the chassis may be pivotally connected to the article retaining bed at two positions, the first position being the same as described in the first embodiment. The second position would be proximal to the opposite end as the first position. The existence of two pivot points has a number of advantages. One being that the user may choose which end to pivot above the other end by unlocking the end opposite to where they wish to dump the load contained in the bed. Additionally, the bed may be easily removed from the chassis by unlocking each of the pivot points.

Figure 23:
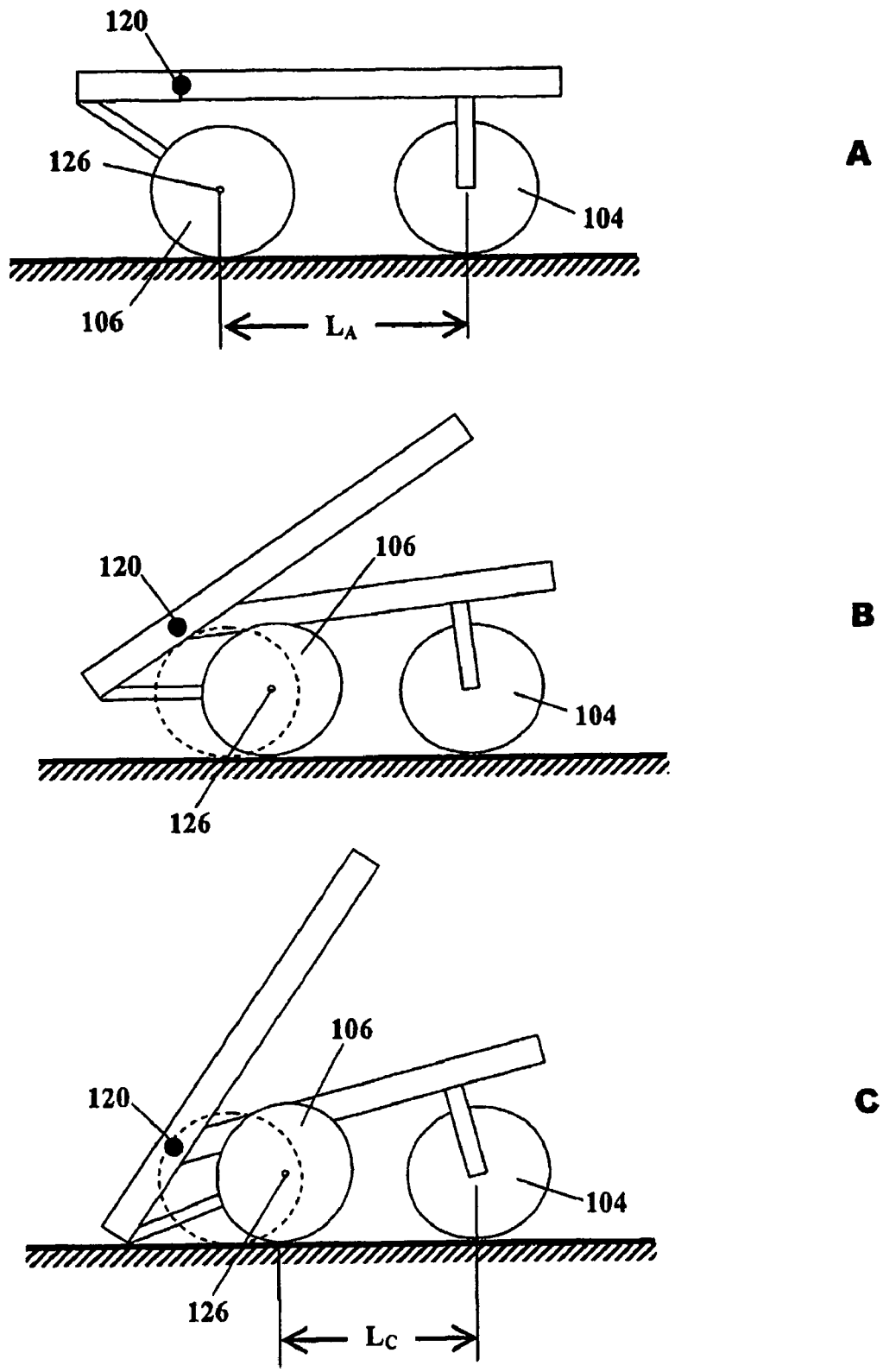
FIGS. 23 A*-C* are side view depicting yet another embodiment of the dumping utility cart of this invention.

It is further noted that the location of the pivot point 120 need not be located forward of the rear axle 126. Referring to FIG. 23, an embodiment of the invention depicting the pivot point 120 located to the rear of the rear axle 126 is presented, in progressive stages of unloading A, B and C. The same action as discussed above is present—namely, a movement of the rear wheels 106 toward the 104 front wheels, during the dumping operation that results in a shorter distance $L_C$ vs. $L_A$ between the axes of the front and rear wheels 106, 104.

It is further recognized that a person of ordinary skill in the art would readily recognize how to employ a power source and linkage assembly to elevate and lower the bed without undue experimentation. Power sources for elevating and lowering the bed might include those powered electrically or hydraulically.

Embodiments of the present invention have been set forth in the figures and the specification. Although specific terms have been utilized, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

The invention claimed is:

1. An articulated cart, comprising:
   a chassis;
   an article retaining bed pivotably coupled to the chassis along an articulation axis;
   a set of front wheels operably coupled to the chassis; and
   a set of rear wheels operably coupled to the article retaining bed,
   the articulation axis is shiftable between a carry orientation intermediate the set of front wheels and the set of rear wheels when the cart is in a carry disposition and a dump orientation wherein the rear set of wheels is intermediate the articulation axis and the set of front wheels when the cart is in a dump disposition.

2. The cart of claim 1, the chassis including at least a pair of spaced apart side rails.

3. The cart of claim 2, a selected one of the side rails being accommodable in a respective ridge defined in the article retaining bed.

4. The cart of claim 1, the article retaining bed including a plurality of inboard, longitudinal ridges.

5. The cart of claim 1, the article retaining bed being molded as a single body.

6. The cart of claim 5, the article retaining bed having a front wall and a rear wall and two opposed side walls formed integral to a bed floor.

7. The cart of claim 6, in which the front wall and rear wall and the two side walls are each stepped outwardly from the bed floor to a top margin.

8. The cart of claim 1, having a shiftable locking mechanism for securing the article retaining bed to the chassis when the cart is in a carry disposition.

9. The cart of claim 1, comprising a front axis for carrying the set of front wheels and a rear axis for carrying the set of rear wheels, characterized by a first wheel base dimension distance between the front axis and rear axis when the cart is in a carry disposition and a lesser second wheelbase dimension distance between the front axis and rear axis when the cart is in a dump disposition.

10. The cart of claim 6, having a plurality of ridges formed in a bed floor.

11. The cart of claim 10, in which the plurality of ridges extend generally longitudinally.

12. The cart of claim 10, in which a portion of the chassis is seated within one of said ridges when the cart is in a carry disposition.

13. The cart of claim 10, the chassis having a pair of spaced apart side rails, each of the side rails being seated within a respective one of said ridges when the cart is in a carry disposition.

14. The cart of claim 1, the front set of wheels bearing against the rear set of wheels in a contacting disposition when the cart is in a dump disposition.

15. The cart of claim 14, the contacting disposition acting to brake the cart.

16. The cart of claim 8, the locking mechanism being biased in a locked disposition securing the article retaining bed to the chassis when the cart is in a carry disposition.

17. An articulated cart, comprising:
    a chassis including at least a pair of spaced apart side rails;
    an article retaining bed pivotably coupled to the chassis;
    a set of front wheels operably coupled to the chassis;
    a set of rear wheels operably coupled to the bed; and
    wherein at least one of the side rails being accommodatable in a respective ridge defined in the article retaining bed.

18. The cart of claim 17, having a plurality of ridges, including said respective ridge, formed in a bed floor in which a portion of the chassis is seated within one of said ridges when the cart is in a carry disposition.

19. The cart of claim 18, in which the plurality of ridges extends generally longitudinally.

* * * * *

UNITED STATES PATENT AND TRADEMARK OFFICE
CERTIFICATE OF CORRECTION

| | | |
|---|---|---|
| PATENT NO. | : 7,887,141 B2 | Page 1 of 1 |
| APPLICATION NO. | : 11/546941 | |
| DATED | : February 15, 2011 | |
| INVENTOR(S) | : Pieschel et al. | |

It is certified that error appears in the above-identified patent and that said Letters Patent is hereby corrected as shown below:

<u>Title Page, Item 75, Inventors</u>:
Delete "Still Water" and insert --Stillwater--.

<u>Column 4, Line 10</u>:
After "defined" insert --by--.

<u>Column 6, Line 28</u>:
After "turn" insert --may--.

<u>Column 8, Line 18</u>:
Delete "as" and insert --has--.

<u>Column 9, Line 43</u>:
Delete "advantages" and insert --advantage--.

<u>Column 10, Line 12</u>:
After "102" insert --to--.

Signed and Sealed this
Tenth Day of May, 2011

David J. Kappos
*Director of the United States Patent and Trademark Office*